United States Patent
Qiao et al.

(10) Patent No.: US 12,543,727 B2
(45) Date of Patent: *Feb. 10, 2026

(54) THAWING FLUID, PREPARATION METHOD THEREFOR AND USE THEREOF

(71) Applicants: PEKING UNIVERSITY THIRD HOSPITAL, Beijing (CN); INSTITUTE OF CHEMISTRY, CHINESE ACADEMY OF SCIENCES, Beijing (CN)

(72) Inventors: Jie Qiao, Beijing (CN); Jie Yan, Beijing (CN); Liying Yan, Beijing (CN); Rong Li, Beijing (CN); Jianjun Wang, Beijing (CN); Shenglin Jin, Beijing (CN); Jianyong Lv, Beijing (CN)

(73) Assignees: PEKING UNIVERSITY THIRD HOSPITAL, Beijing (CN); INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 1072 days.

This patent is subject to a terminal disclaimer.

(21) Appl. No.: 17/594,345

(22) PCT Filed: Mar. 2, 2020

(86) PCT No.: PCT/CN2020/077475
§ 371 (c)(1),
(2) Date: Oct. 12, 2021

(87) PCT Pub. No.: WO2020/207153
PCT Pub. Date: Oct. 15, 2020

(65) Prior Publication Data
US 2022/0192180 A1    Jun. 23, 2022

(30) Foreign Application Priority Data

Apr. 9, 2019  (CN) .......................... 201910282415.5
Apr. 9, 2019  (CN) .......................... 201910282421.0

(51) Int. Cl.
*A01N 1/02*    (2006.01)
*A01N 1/125*   (2025.01)
*A01N 1/162*   (2025.01)

(52) U.S. Cl.
CPC ............. *A01N 1/125* (2025.01); *A01N 1/162* (2025.01)

(58) Field of Classification Search
CPC ..... A01N 1/0221; A01N 1/0284; A01N 1/125
See application file for complete search history.

(56) References Cited

U.S. PATENT DOCUMENTS 6,391,224 B1 *  5/2002  Wowk ................... A01N 37/02
                                                    47/2
2009/0197331 A1 *  8/2009  Kato ................ C07K 14/43586
                                                    435/374

(Continued)

FOREIGN PATENT DOCUMENTS

CN    1844371 A   10/2006
CN  102124098 A    7/2011

(Continued)

OTHER PUBLICATIONS

Deller (Deller, R Vatish M Mitchell D et al Synthetic Polymers enable non vitreous cellular cryopreservation by reducing ice crystal growth during thawing Nat Commun 5, 3244 (2014) (Year: 2014).*

(Continued)

*Primary Examiner* — Tracy Vivlemore
*Assistant Examiner* — Lauren K Van Buren
(74) *Attorney, Agent, or Firm* — NKL Law; Allen Xue

(57) ABSTRACT

A thawing solution has 0.1-50 g of a biomimetic material for controlling ice, 0-1.0 mol L$^{-1}$ of a water-soluble sugar, and (Continued)

balance of a buffer solution. The biomimetic material for controlling ice is a material for controlling ice having an ice-philic group and a hydrophilic group. The hydrophilic group is a functional group that can form a non-covalent interaction with water molecules, and the ice-philic group is a functional group that can form a non-covalent interaction with ice. Using the thawing solution and the thawing reagent prepared from the biomimetic material for controlling ice, which material has ice-philic and hydrophilic properties, the growth and recrystallization of ice crystals can be effectively controlled, and damage to cells or tissue caused by uncontrolled growth of the ice crystals during recovery can be significantly ameliorated.

7 Claims, 2 Drawing Sheets

(56) References Cited

U.S. PATENT DOCUMENTS

| | | | |
|---|---|---|---|
| 2011/0172315 | A1 | 7/2011 | Matsumura et al. |
| 2012/0244616 | A1 | 9/2012 | Jo et al. |
| 2015/0017628 | A1 | 1/2015 | Gibson et al. |
| 2017/0172138 | A1 | 6/2017 | Hubel et al. |
| 2017/0295777 | A1* | 10/2017 | Wei .................. C07K 7/06 |

FOREIGN PATENT DOCUMENTS

| | | |
|---|---|---|
| CN | 103918642 A | 7/2014 |
| CN | 106993606 A | 8/2017 |
| CN | 107047539 A | 8/2017 |
| CN | 108207930 A | 6/2018 |
| CN | 108244102 A | 7/2018 |
| CN | 108347916 A | 7/2018 |
| CN | 108464300 A | 8/2018 |
| CN | 108641999 A | 10/2018 |
| CN | 108753698 A | 11/2018 |
| CN | 109136176 A | 1/2019 |
| JP | 2009247276 A | 10/2009 |
| JP | 2010213692 A | 9/2010 |
| WO | 9110361 A1 | 7/1991 |
| WO | 2010046949 A1 | 4/2010 |
| WO | 2013117925 A1 | 8/2013 |
| WO | 2017066454 A2 | 4/2017 |
| WO | WO-2018005802 A1 * | 1/2018 ........... A01N 1/0221 |
| WO | WO-2018155622 A1 * | 8/2018 ............... A61F 2/02 |

OTHER PUBLICATIONS

Deng, Xiaohui (ed.), "Reproductive Medicine Technology and Its Color Atlas", Shandong Science and Technology Press, 1st Edition, Oct. 31, 2004, pp. 111-114, ISBN 7-5331-3748-5.

Wada, Risei et al., "Junction Size and Mechanical Properties of Atactic and Syndiotactic High-Molecular Weight Poly (vinyl alcohol Hydro-gels)", Kobunshi Robunshu, vol. 69, No. 11, Nov. 2012, pp. 623-636.

"Illustrated Method for Thawing Blastocysts Using the B-REV Reagent Kit," Proteinsynteze (vitrification.ru), archived on the Wayback Machine, Nov. 5, 2016. Available at: https://web.archive.org/web/20161105075134/https://vitrification.ru/articles/20-razmorazhivanie-blastotsist-po-prdtokolu-b-rev.

* cited by examiner

THAWING FLUID, PREPARATION METHOD THEREFOR AND USE THEREOF

The present application is the U.S. national stage entry of PCT International Application No. PCT/CN2020/077475, filed Mar. 2, 2020, which claims the priority to Chinese Patent Application No. 201910282421.0 entitled "THAWING FLUID FOR CRYOPRESERVATION AND METHOD FOR THAWING", and Chinese Patent Application No. 201910282415.5 entitled "USE OF THAWING FLUID IN THAWING CRYOPRESERVED OOCYTES OR EMBRYOS" filed with the China National Intellectual Property Administration on Apr. 9, 2019. These two prior applications are herein incorporated by reference in their entirety.

TECHNICAL FIELD

The present invention relates to the technical field of biomedical materials, and particularly to a thawing solution for cryopreservation and a method for thawing.

BACKGROUND

Cryopreservation is to store a biological material at an ultra-low temperature to slow down or stop cell metabolism and division, and to continue development once normal physiological temperature is recovered. Since its advent, this technology has become one of indispensable research methods in the field of natural science, and has been widely adopted. In recent years, with the increasing pressure of life, human fertility tends to decline year by year, and thus fertility preservation is more and more emphasized. The cryopreservation of human germ cells (sperms and oocytes), gonad tissues and the like has become an important means of fertility preservation. In addition, as the world population ages, the need for cryopreservation of donated human cells, tissues or organs that can be used for regenerative medicine and organ transplantation is growing fast. Therefore, how to efficiently cryopreserve precious cells, tissues and organ resources for future needs has become a scientific and technical problem to be solved urgently.

At present, the most commonly used cryopreservation method is vitrification. During the thawing process, attention needs to be paid to the prevention of freeze-thaw damage such as ice crystals, cold shock, solute effect, breaking damage, recrystallization and osmotic shock. Based on the consideration of improving the survival rate of resuscitated embryos and oocytes, the freezing and thawing scheme is generally as follows: by a rapid thawing process, blastulas or oocytes with high osmotic pressure are thawed in culture media containing a certain concentration gradient of a cryoprotectant, thus gradually reducing the difference of osmotic pressures inside and outside the cells, decreasing the speed of change in the cell volume and preventing the damages in cells or embryos during the thawing process. Most of thawing reagents widely used in clinic practice at present comprise sucrose, serum and buffer as main ingredients. However, such thawing solutions cannot effectively control the growth and recrystallization of ice crystals during the thawing process, resulting in the damages in cells. In addition, existing thawing solutions have the problems such as short shelf-life and risks of parasitic biological contaminants, due to unspecified composition and easy deterioration of serum.

SUMMARY

In order to overcome the aforementioned drawbacks of the prior art, the present invention provides a thawing solution for cryopreservation and a method for thawing.

The present invention is implemented by the following technical solutions:

A thawing solution, comprising, per 100 mL: 0.1-50 g of a biomimetic ice growth inhibition material, 0-1.0 mol $L^{-1}$ of a water-soluble saccharide and the balance of a buffer, wherein, the biomimetic ice growth inhibition material is an ice growth inhibition material with an ice-philic group and a hydrophilic group.

According to the present invention, the hydrophilic group is a functional group capable of forming a non-covalent interaction with a water molecule, for example, forming a hydrogen bond, a van der Waals interaction, an electrostatic interaction, a hydrophobic interaction or a π-π interaction with water; illustratively, the hydrophilic group may be selected from at least one of hydroxyl (—OH), amino (—NH$_2$), carboxyl (—COOH) and acylamino (—CONH$_2$), or from a compound molecule, such as proline (L-Pro), arginine (L-Arg), lysine (L-Lys), histidine (L-His) and glycine (L-Gly), glucono delta-lactone (GDL) and a saccharide, and a molecular fragment thereof.

According to the present invention, the ice-philic group is a functional group capable of forming a non-covalent interaction with ice, for example, forming a hydrogen bond, a van der Waals interaction, an electrostatic interaction, a hydrophobic interaction or a π-π interaction with ice; illustratively, the ice-philic group may be selected from hydroxyl (—OH), amino (—NH$_2$), phenyl (—C$_6$H$_5$) and pyrrolidinyl (—C$_4$H$_8$N), or, from a compound molecule, such as glutamine (L-Gln), threonine (L-Thr), aspartic acid (L-Asn), benzene (C$_6$H$_6$) and pyrrolidine (C$_4$H$_9$N), and a molecular fragment thereof.

According to the present invention, the biomimetic ice growth inhibition material is selected from at least one of or a combination of two or more of a polyvinyl alcohol (PVA), an amino acid, a polypeptide and a polyamino acid.

According to the present invention, the amino acid may be selected from one of or a combination of two or more of arginine, threonine, proline, lysine, histidine, glutamine, aspartic acid, glycine and the like; the polyamino acid may be a homopolymer (with a degree of polymerization ≥2, preferably 2-40, for example, 6, 8, 15 and 20) of at least one selected from lysine, arginine, proline, threonine, histidine, glutamic acid, aspartic acid, glycine and the like.

Illustratively, the polypeptide is a polypeptide consisting of two or more of the aforementioned amino acids or a glycopeptide derivative formed by a reaction between an amino acid and a saccharide (e.g., gluconolactone). For example, the polypeptide is a polypeptide consisting of 2-8 different amino acids, and for example, a dipeptide, a tripeptide or a tetrapeptide. In embodiments of the present invention, the polypeptide is one or more of L-Thr-L-Arg (TR), L-Thr-L-Pro (TP), L-Arg-L-Thr (RT), L-Pro-L-Thr (PT), L-Thr-L-Arg-L-Thr (TRT), L-Thr-L-Pro-L-Thr (TPT), L-Ala-L-Ala-L-Thr (AAT) or L-Thr-L-Cys-L-Thr (TCT).

According to the present invention, the content of the biomimetic ice growth inhibition material is 1.0-50 g, 2.0-20 g or 5.0-10 g. In one embodiment, the content of the biomimetic ice growth inhibition material is 3.0 g, 4.0 g, 5.0 g, 10 g, 25 g or 30 g.

In one embodiment of the present invention, the biomimetic ice growth inhibition material comprises 1.0-6.0 g of the PVA.

In one embodiment of the present invention, the biomimetic ice growth inhibition material comprises 1.0-30 g of the amino acid. Illustratively, the amino acid is a combination of arginine and threonine, for example, comprising 1.0-20 g, 1.0-10 g or 1.0-5 g of arginine and 1.0-10 g, 1.0-5.0 g or 1.0-2.5 g of threonine.

In one embodiment of the present invention, the biomimetic ice growth inhibition material comprises 0.1-9.0 g of the polyamino acid, for example, 1-5.0 g. Illustratively, the polyamino acid is poly-L-proline and/or poly-L-arginine.

In one embodiment of the present invention, the biomimetic ice growth inhibition material comprises 1.0-50 g of the polypeptide; for example, 1.0-25 g, 1.0-13 g, 1.0-10 g or 1.0-5.0 g.

In one embodiment of the present invention, the biomimetic ice growth inhibition material is a combination of the PVA and the amino acid, the polypeptide and/or the polyamino acid.

According to the present invention, the content of the water-soluble saccharide per 100 mL of thawing solution is 0.1-1.0 mol $L^{-1}$, for example, 0.1-0.8 mol $L^{-1}$, 0.2-0.6 mol $L^{-1}$, e.g., 0.25 mol $L^{-1}$, 0.5 mol $L^{-1}$, 1.0 mol $L^{-1}$.

A thawing reagent, comprising a thawing solution I, a thawing solution II, a thawing solution III and a thawing solution IV, wherein the thawing solutions I-IV have compositions of the thawing solution described above.

According to the thawing reagent of the present invention, the concentration gradients of the biomimetic ice growth inhibition material in the thawing solutions I-IV are not particularly limited. The concentrations of the biomimetic ice growth inhibition material in the thawing solutions may be the same or different. As an exemplary embodiment, the concentrations of the biomimetic ice growth inhibition material in the thawing solutions I-IV are different. For example, the content of the biomimetic ice growth inhibition material in the thawing solution II is 50%-100% of that in the thawing solution I, and the content of the biomimetic ice growth inhibition material in the thawing solution III is 50%-100% of that in the thawing solution II.

In the thawing reagent according to the present invention, the thawing solutions I-IV comprise 1.0-6.0 g of the PVA; and preferably, the concentrations of the PVA in the thawing solutions I-IV are the same.

In the thawing reagent according to the present invention, the concentration of the water-soluble saccharide in the thawing solution II is 50%-100% of that in the thawing solution I, the concentration of the water-soluble saccharide in the thawing solution III is 50%-100% of that in the thawing solution II, and the concentration of the saccharide in the thawing solution IV is 0.

In one embodiment of the thawing reagent of the present invention, the thawing solution I comprises, per 100 mL: 1.0-50 g of the amino acid, 1.0-5.0 g of the PVA, the water-soluble saccharide at 1.0 mol $L^{-1}$ and the balance of the buffer;

the thawing solution II comprises, per 100 mL: 1.0-25 g of the amino acid, 1.0-5.0 g of the PVA, the water-soluble saccharide at 0.5 mol $L^{-1}$ and the balance of the buffer;

the thawing solution III comprises, per 100 mL: 1.0-12.5 g of the amino acid, 1.0-5.0 g of the PVA, the water-soluble saccharide at 0.25 mol $L^{-1}$ and the balance of the buffer;

the thawing solution IV comprises, per 100 mL: 0-6.25 g of the amino acid, 1.0-5.0 g of the PVA and the balance of the buffer.

In one embodiment of the thawing reagent of the present invention, the thawing solution I comprises, per 100 mL: 1.0-5.0 g of the PVA, the water-soluble saccharide at 1.0 mol $L^{-1}$ and the balance of the buffer;

the thawing solution II comprises, per 100 mL: 1.0-5.0 g of the PVA, the water-soluble saccharide at 0.5 mol $L^{-1}$ and the balance of the buffer;

the thawing solution III comprises, per 100 mL: 1.0-5.0 g of the PVA, the water-soluble saccharide at 0.25 mol $L^{-1}$ and the balance of the buffer;

the thawing solution IV comprises, per 100 mL: 1.0-5.0 g of the PVA and the balance of the buffer.

In one embodiment of the thawing reagent of the present invention, the thawing solution I comprises, per 100 mL: 1.0-9.0 g of the polyamino acid, 0.1-5.0 g of the PVA, the water-soluble saccharide at 1.0 mol $L^{-1}$ and the balance of the buffer;

the thawing solution II comprises, per 100 mL: 0.1-4.5 g of the polyamino acid, 1.0-5.0 g of the PVA, the water-soluble saccharide at 0.5 mol $L^{-1}$ and the balance of the buffer;

the thawing solution III comprises, per 100 mL: 0.1-2.3 g of the polyamino acid, 1.0-5.0 g of the PVA, the water-soluble saccharide at 0.25 mol $L^{-1}$ and the balance of the buffer;

the thawing solution IV comprises, per 100 mL: 0-1.2 g of the polyamino acid, 1.0-5.0 g of the PVA and the balance of the buffer.

In one embodiment of the thawing reagent of the present invention, the thawing solution I comprises, per 100 mL: 1.0-50 g of the polypeptide, 1.0-5.0 g of the PVA, the water-soluble saccharide at 1.0 mol $L^{-1}$ and the balance of the buffer;

the thawing solution II comprises, per 100 mL: 1.0-25 g of the polypeptide, 1.0-5.0 g of the PVA, the water-soluble saccharide at 0.5 mol $L^{-1}$ and the balance of the buffer;

the thawing solution III comprises, per 100 mL: 1.0-12.5 g of the polypeptide, 1.0-5.0 g of the PVA, the water-soluble saccharide at 0.25 mol $L^{-1}$ and the balance of the buffer;

the thawing solution IV comprises, per 100 mL: 0-6.25 g of the polypeptide, 1.0-5.0 g of the PVA and the balance of the buffer.

According to the present invention, the water-soluble saccharide may be at least one of a non-reducing disaccharide, a water-soluble polysaccharide and a glycoside, for example, selected from sucrose and trehalose, preferably, sucrose. The water-soluble saccharide can protect cell membranes and prevent cell from sedimentation.

According to the present invention, the buffer may be selected from at least one of DPBS, hepes-buffered HTF buffer and other cell culture buffers.

According to the present invention, the PVA is selected from one of or a combination of two or more of an isotactic PVA, a syndiotactic PVA and an atactic PVA. For example, the PVA has a syndiotacticity of 15%-65%, specifically, for example, 40%-60% or 53%-55%. Atactic PVA is preferred, for example, the PVA with a syndiotacticity of 45%-65%.

According to the present invention, the PVA may be selected from a PVA having a molecular weight of 10-500 kDa or higher, for example, 10-30 kDa, 30-50 kDa, 80-90 kDa, and 200-500 kDa.

According to the present invention, the PVA may be selected from a PVA having a degree of hydrolysis greater than 80%, for example, 80%-99%, 82%-87%, 87%-89%, 89%-99%, and 98%-99%.

The thawing solution of the present invention may be formulated by methods known in the art, such as:

dissolving the biomimetic ice growth inhibition material in one part of the buffer and adjusting the pH; dissolving the water-soluble saccharide in the other part of the buffer; and cooling the two solutions to room temperature, and mixing the two solutions.

A method for thawing a cryopreserved cell, tissue or organ, comprising:

thawing the cryopreserved cell, tissue or organ in the thawing solution I at 37° C. for 3-5 minutes, and then sequentially thawing the cryopreserved cells or tissues in the thawing solution II, the thawing solution III and the thawing solution IV for 3-5 minutes at room temperature.

The thawing solution and the thawing reagent can be used for thawing cryopreserved oocytes, embryo, tissue or organ. For example, the tissue or the organ is an ovarian tissue or an ovarian organ. Furthermore, the present invention provides use of the thawing solution and the thawing reagent, specifically use in thawing a cryopreserved oocytes, embryo, tissue or organ, for example, the tissue or the organ is an ovarian tissue or an ovarian organ.

Beneficial Effects

The thawing solution and the thawing reagent of the present invention are prepared from the biomimetic ice growth inhibition material with ice-philic and hydrophilic properties, can effectively control the growth of ice crystals and significantly mitigate the damage of cells or tissues caused by the change in temperature in the process of thawing. The thawing solution and the thawing reagent have good biocompatibility, are free of animal serum, and are low in toxicity, thus having lower risks such as short shelf life and introduction of parasitic biological contaminants, and advantages in maintaining passaging stability of cells or tissues as compared with conventional thawing solutions containing serum. The present invention has simple composition, cost-efficiency and good application prospect.

DETAILED DESCRIPTION

Figure 1:
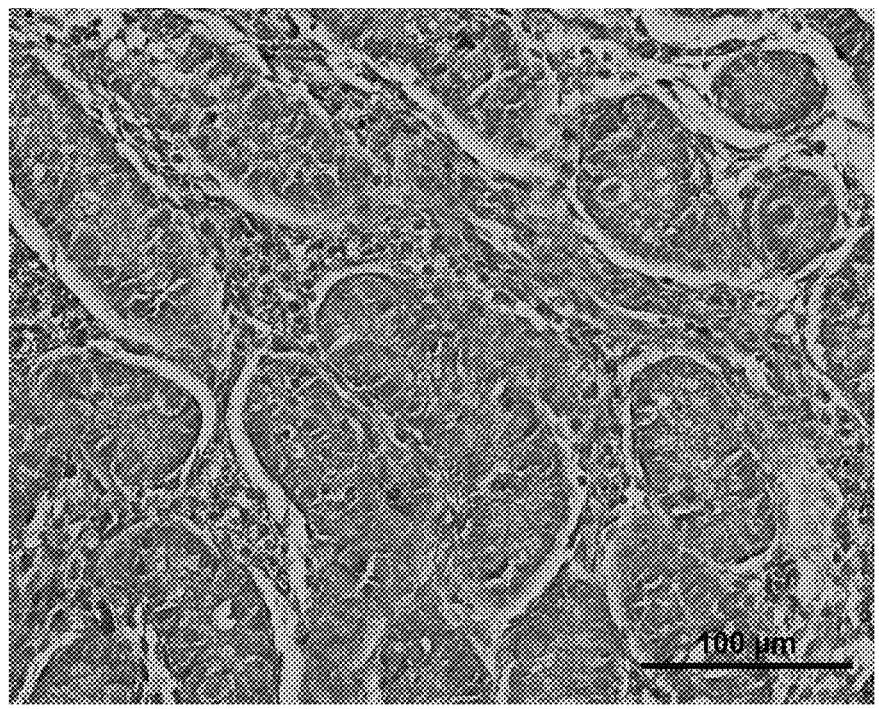
FIG. 1 is a photograph of a stained slice of a fresh unfrozen ovarian organ.

The preparation method of the present invention will be further illustrated in detail with reference to the following specific examples. It should be understood that the following examples are merely exemplary illustration and explanation of the present invention, and should not be construed as limiting the protection scope of the present invention. All techniques implemented based on the aforementioned contents of the present invention are encompassed within the protection scope of the present invention.

Unless otherwise stated, the experimental methods used in the following examples are conventional methods. Unless otherwise stated, the reagents, materials, and the like used in the following examples are commercially available.

The PVA used in the examples of the present invention has a syndiotacticity of 50%-55%, a molecular weight of 13-23 kDa and a degree of hydrolysis of 98%.

In the examples of the present invention, poly-L-proline used in the cryopreservation solution has a degree of polymerization of 15 and a molecular weight of 1475. Poly-L-proline in a thawing solution has a degree of polymerization of 8 and a molecular weight of 795.

The following freezing equilibration solution and cryopreservation solution were used in the examples of the present invention:

Cryopreservation solution A (total volume: 100 mL): 2.0 g of a PVA was dissolved in 30 mL of DPBS in a water bath at 80° C. by heating and magnetic stirring, and pH was adjusted to 7.0 to give a solution 1; 17 g (0.05 mol) of sucrose (the final concentration of the sucrose in the cryopreservation solution was 0.5 mol $L^{-1}$) was ultrasonically dissolved in 25 mL of DPBS, and after the sucrose was completely dissolved, 10 mL of ethylene glycol was added to give a solution 2; after returning to room temperature, the solution 1 and the solution 2 were well mixed, the pH was adjusted, and the mixture was diluted to 100 mL with DPBS for later use.

Freezing equilibration solution a (total volume: 100 mL): 2.0 g of a PVA was dissolved in 50 mL of DPBS in a water bath at 80° C. by heating and magnetic stirring, and pH was adjusted to 7.0 after the PVA was completely dissolved; the solution was added with 7.5 mL of ethylene glycol and well mixed, the pH was adjusted, and the mixture was diluted 100 mL with DPBS for later use.

Cryopreservation solution B (total volume: 100 mL): 2.0 g of a PVA was dissolved in 25 mL of DPBS in a water bath at 80° C. by heating and magnetic stirring, and pH was adjusted to 7.0 to give a solution 1; 1.5 g of poly-L-proline was ultrasonically dissolved in another 20 mL of DPBS, and the pH was adjusted to 7.0 to give a solution 2; 17 g (0.05 mol) of sucrose (the final concentration of the sucrose in the cryopreservation solution was 0.5 mol $L^{-1}$) was ultrasonically dissolved in 25 mL of DPBS, and after the sucrose was completely dissolved, 10 mL of ethylene glycol was added to give a solution 3; after returning to room temperature, the solution 1, the solution 2 and the solution 3 were well mixed, the pH was adjusted, and the mixture was diluted to 100 mL with DPBS for later use.

Freezing equilibration solution b (similar with freezing equilibration solution a; total volume: 100 mL): 2.0 g of a PVA was dissolved in 40 mL of DPBS in a water bath at 80° C. by heating and magnetic stirring, and pH was adjusted to 7.0 after the PVA was completely dissolved; the solution was added with 7.5 mL of ethylene glycol and well mixed, the pH was adjusted, and the mixture was diluted to 100 mL with DPBS for later use.

Cryopreservation solution C, comprising, per 1 mL: 10% (v/v) of ethylene glycol, 20% (v/v) of fetal bovine serum, sucrose at 0.5 M and the balance of DPBS.

Freezing equilibration solution c, comprising, per 1 mL: 7.5% (v/v) of ethylene glycol, 20% (v/v) of fetal bovine serum and the balance of DPBS.

Example 1

A thawing solution I comprises, per 100 mL:

| Substances | Content |
|---|---|
| PVA (mg $mL^{-1}$) | 20 |
| Sucrose (mol · $L^{-1}$) | 1.0 |
| DPBS (V) | Balance |

A thawing solution II comprises, per 100 mL:

| Substances | Content |
| --- | --- |
| PVA (mg mL$^{-1}$) | 20 |
| Sucrose (mol · L$^{-1}$) | 0.5 |
| DPBS (V) | Balance |

A thawing solution III comprises, per 100 mL:

| Substances | Content |
| --- | --- |
| PVA (mg mL$^{-1}$) | 20 |
| Sucrose (mol · L$^{-1}$) | 0.25 |
| DPBS (V) | Balance |

A thawing solution IV comprises, per 100 mL:

| Substances | Content |
| --- | --- |
| PVA (mg mL$^{-1}$) | 20 |
| DPBS (V) | Balance |

Example 2

A thawing solution I comprises, per 100 mL:

| Substances | Content |
| --- | --- |
| Poly-L-proline (mg mL$^{-1}$) | 10 |
| PVA (mg mL$^{-1}$) | 20 |
| Sucrose (mol · L$^{-1}$) | 1.0 |
| DPBS (V) | Balance |

A thawing solution II comprises, per 100 mL:

| Substances | Content |
| --- | --- |
| Poly-L-proline (mg mL$^{-1}$) | 5.0 |
| PVA (mg mL$^{-1}$) | 20 |
| Sucrose (mol · L$^{-1}$) | 0.5 |
| DPBS (V) | Balance |

A thawing solution III comprises, per 100 mL:

| Substances | Content |
| --- | --- |
| Poly-L-proline (mg mL$^{-1}$) | 2.5 |
| PVA (mg mL$^{-1}$) | 20 |
| Sucrose (mol · L$^{-1}$) | 0.25 |
| DPBS (V) | Balance |

A thawing solution IV comprises, per 100 mL:

| Substances | Content |
| --- | --- |
| PVA (mg mL$^{-1}$) | 20 |
| DPBS (V) | Balance |

Comparative Example 1

The thawing solution I comprises: sucrose at 1.0 mol L$^{-1}$, 20% of serum and the balance of DPBS;

The thawing solution II comprises: sucrose at 0.5 mol L$^{-1}$, 20% of serum and the balance of DPBS;

The thawing solution III comprises: sucrose at 0.25 mol L$^{-1}$, 20% of serum and the balance of DPBS;

The thawing solution IV comprises: sucrose at 0 mol L$^{-1}$, 20% of serum and the balance of DPBS.

Application Example 1: Thawing of Cryopreserved Oocytes

The method for cryopreserving oocytes of the present invention specifically comprises the following steps: firstly the oocytes were equilibrated in a freezing equilibration solution for 5 minutes; then the oocytes were equilibrated in the cryopreservation solution for 45 seconds; the oocytes equilibrated in the cryopreservation solution were loaded onto straws; then the straws were quickly put into liquid nitrogen (−196° C.); and the straws were closed for cryopreservation.

The mouse oocytes were thawed with the thawing reagents prepared from the formulas in Example 1 and Example 2 and the thawing reagents prepared in the Comparative Example 1. The method for thawing the oocytes specifically comprises the following steps: the oocytes were quickly transferred from the liquid nitrogen to the thawing solution I at 37° C. and incubated for 3-5 minutes; then the oocytes were sequentially incubated in the thawing solution II, the thawing solution III and the thawing solution IV for 3 minutes each at room temperature; the oocytes were then transferred into culture media and incubated in a 5% carbon dioxide incubator at 37° C. for 2 h; and the survival rate of the oocytes was calculated (Table 1).

Application Example 2: Thawing of Cryopreserved Embryos

The method for cryopreserving embryos of the present invention specifically comprises the following steps: firstly the embryos were equilibrated in a freezing equilibration solution for 8 minutes; then the embryos were equilibrated in the cryopreservation solution prepared as per the formula above for 50 seconds; the embryos equilibrated in the cryopreservation solution were loaded onto straws; then the straws were quickly put into liquid nitrogen (−196° C.); and the straws were closed for cryopreservation.

The mouse embryos were thawed with the thawing reagents prepared from the formulas in Example 1 and Example 2 and the thawing reagents prepared in the Comparative Example 1. The method for thawing the embryos specifically comprises the following steps: the embryos were quickly transferred from the liquid nitrogen to the thawing solution I at 37° C. and incubated for 3-5 minutes; then the embryos were sequentially incubated in the thawing solution II, the thawing solution III and the thawing solution IV for 3 minutes each at room temperature; the embryos were then transferred into culture media and incubated in a 5% carbon dioxide incubator at 37° C. for 2 h; and the survival rate of the embryos was calculated (Table 2).

The survival rate in the examples of the present invention is the average survival rate of 3-12 duplicate experiments.

TABLE 1

Comparison of survival rate of mouse oocytes thawed with thawing solutions

| No. | Equilibration solution | Freezing solution | Thawing solution | Total number of frozen oocytes | Survival rates after 2 h (%) |
|---|---|---|---|---|---|
| Application Embodiment 1 | a | A | Example 1 | 53 | 96.5 |
| Application Embodiment 2 | b | B | Example 2 | 60 | 98.6 |
| Application Embodiment 3 | c | C | Example 1 | 44 | 94.7 |
| Comparative Embodiment 1 | a | A | Comparative Example 1 | 50 | 93.4 |
| Comparative Embodiment 2 | b | B | Comparative Example 1 | 39 | 89.7 |
| Comparative Embodiment 3 | c | C | Comparative Example 1 | 96 | 81.9 |

TABLE 2

Comparison of survival rate of mouse embryos thawed with thawing solutions

| No. | Equilibration solution | Freezing solution | Thawing solution | Total number of embryos | Survival rates after 2 h (%) |
|---|---|---|---|---|---|
| Comparative Embodiment 4 | c | C | Comparative Example 1 | 39 | 82.0 |
| Application Embodiment 4 | b | B | Example 2 | 39 | 97.4 |
| Application Embodiment 5 | a | A | Example 1 | 37 | 97.1 |

It can be seen from the data in Tables 1 and 2 that the survival rate of the oocytes thawed with the thawing reagent of the present invention was greater than 94%, even up to 98.6%, and that the survival rate of the thawed embryos was greater than 97%, which was much higher than those in Comparative Example 1 (commercially available thawing solutions), indicating that the effectiveness of the thawing reagent was superior to that of conventional vitrification thawing solutions in thawing oocytes and embryos. In addition, the thawing reagent of the present invention is free of serum, poses low risks of parasitic biological contaminants and the like, and is more favorable for maintaining the stability of passage of cells or tissues.

Application Example 3: Thawing of Cryopreserved Intact Ovarian Organs or Ovarian Tissue Slices The combination of the aforementioned freezing equilibration solution a and cryopreservation solution A was used to cryopreserve an ovarian organ slice of a 3-day-old newborn mice and an ovarian tissue slice of sexually mature mice, and then the aforementioned thawing solution of Example 1 was used for thawing. The freezing and thawing process comprises the following steps: the intact ovarian organs or ovarian tissue slices were equilibrated in the equilibration solution at room temperature for 25 minutes, equilibrated in the prepared cryopreservation solution for 15 minutes, and then loaded onto straws. The straws were put into liquid nitrogen for preservation. After thawing, the intact ovarian organs or ovarian tissue slices were incubated in culture media (10% FBS+a-MEM) in a 5% $CO_2$ incubator at 37° C. for thawing for 2 hours and then fixed with 4% paraformaldehyde, embedded in paraffin and stained with HE for morphological observation.

Figure 2:
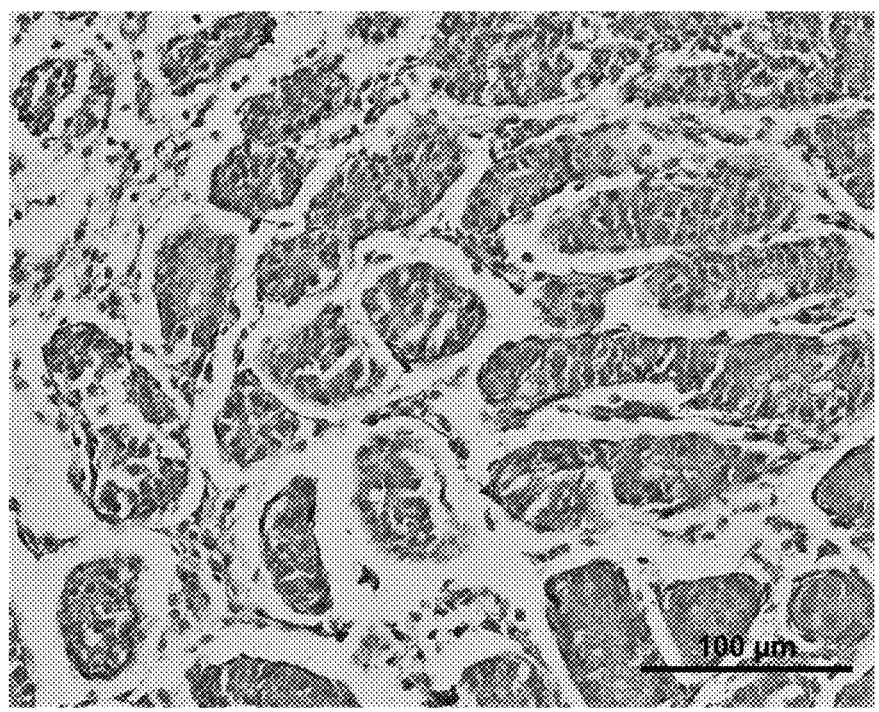
FIG. 2 is a photograph of a stained slice of an ovarian organ thawed by the thawing solution of Example 1.
Figure 3:
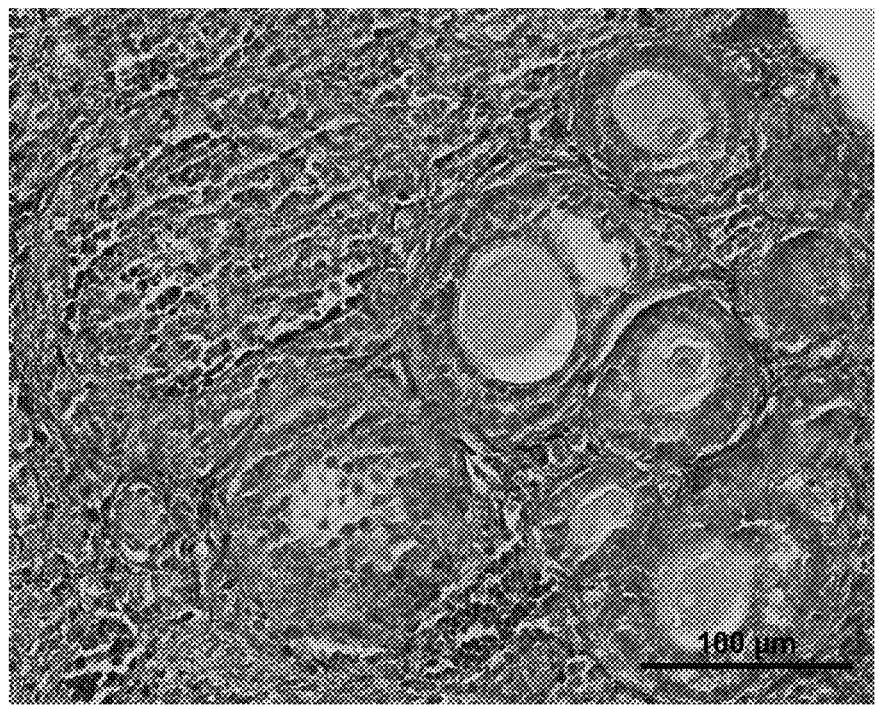
FIG. 3 is a photograph of a stained slice of a fresh unfrozen ovarian tissue.
Figure 4:
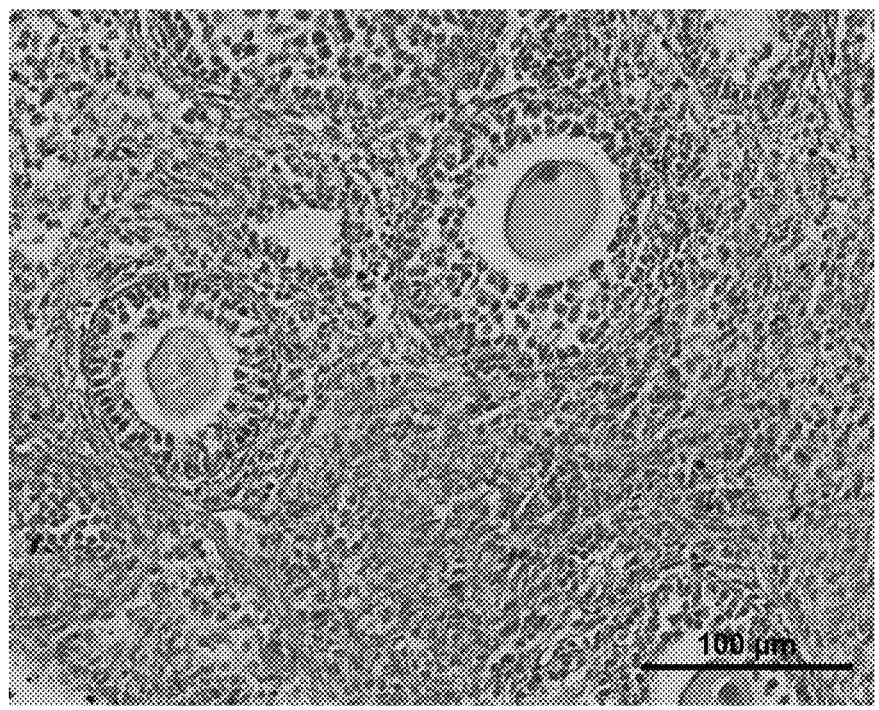
FIG. 4 is a photograph of a stained slice of an ovarian tissue thawed by the thawing solution of Example 1.

The results are shown in FIGS. 1-4, wherein FIG. 1 is a photograph of a stained slice of a fresh unfrozen ovarian organ; FIG. 2 is a photograph of a stained slice of an ovarian organ thawed by the thawing solution of Example 1; FIG. 3 is a photograph of a stained slice of a fresh unfrozen ovarian tissue; and FIG. 4 is a photograph of a stained slice of an ovarian tissue thawed by the thawing solution of Example 1. It can be seen that after thawing with the thawing solution of Example 1, the follicular structure and interstitial structure of the ovarian organs or the ovarian tissues were relatively intact, the cytoplasm of cells was relatively homogeneous and lightly stained in a relatively large amount, and nucleus shrinkage and deep staining were relatively mild; the structure of the vascular wall was intact, lumen collapse was mild, the cytoplasm of endothelial cells was homogeneous and lightly stained in a relatively large amount, nucleus shrinkage and deep staining were relatively mild, thus suggesting a good thawing effect.

The examples of the present invention have been described above. However, the present invention is not limited to the above examples. Any modifications, equivalents, improvements and the like made without departing from the spirit and principle of the present invention shall fall within the protection scope of the present invention.

The invention claimed is:

1. A thawing solution comprising, per 100 mL: 0.1-50 g of a biomimetic ice growth inhibition material, a water-soluble saccharide at 0-1.0 mol $L^{-1}$ and a balance of a buffer, wherein the biomimetic ice growth inhibition material is an atactic polyvinyl alcohol (PVA) having a syndiotacticity of 45%-65% and a molecular weight of 10 kDa-500 kDa, or a combination of said PVA with an amino acid, or with a polypeptide, or with a polyamino acid.

2. The thawing solution according to claim 1, wherein the amino acid is selected from one of or a combination of two or more of arginine, threonine, proline, lysine, histidine, glutamine, aspartic acid, and glycine;
and/or
   the polyamino acid is a homopolymer of at least one selected from lysine, arginine, proline, threonine, histidine, glutamic acid, aspartic acid, and glycine;
and/or
   the polypeptide is one or two or more of L-Thr-L-Arg (TR), L-Thr-L-Pro (TP), L-Arg-L-Thr (RT), L-Pro-L-Thr (PT), L-Thr-L-Arg-L-Thr (TRT), L-Thr-L-Pro-L-Thr (TPT), L-Ala-L-Ala-L-Thr (AAT) or L-Thr-L-Cys-L-Thr (TCT);
and/or
   the PVA has a degree of hydrolysis of 80%-99%, 82%-87%, 87%-89%, 89%-99% or 98%-99%.

3. The thawing solution according to claim 1, wherein the content of the biomimetic ice growth inhibition material is 1.0-30 g; or
   the biomimetic ice growth inhibition material comprises 1.0-6.0 g of the PVA; or
   the biomimetic ice growth inhibition material comprises 1.0-30 g of the amino acid; or
   the biomimetic ice growth inhibition material comprises 0.1-9.0 g of the polyamino acid; or
   the biomimetic ice growth inhibition material comprises 1.0-13 g of the polypeptide; or
   the biomimetic ice growth inhibition material is a combination of the PVA with the amino acid, the polypeptide and/or the polyamino acid.

4. The thawing solution according to claim 3, wherein the amino acid is a combination of arginine and threonine.

5. The thawing solution according to claim 4, wherein the water-soluble saccharide is selected from sucrose, trehalose, a water-soluble cellulose and a polysucrose.

6. The thawing solution according to claim 1, wherein
   the water-soluble saccharide is at least one of a non-reducing disaccharide, a water-soluble polysaccharide and a glycoside; and/or
   the buffer is selected from at least one of DPBS, hepes-buffered HTF buffer and other cell buffers.

7. The thawing solution according to claim 1 comprising, wherein the PVA has a syndiotacticity of 50%-55% and a molecular weight of 13 kDa-23 kDa.

* * * * *